(12) United States Patent
Price

(10) Patent No.: US 7,717,285 B2
(45) Date of Patent: May 18, 2010

(54) DISPOSABLE SPLATTER GUARD

(76) Inventor: Bradley W. Price, 15860 Knightsbridge Ct., Fort Myers, FL (US) 33908

( * ) Notice: Subject to any disclaimer, the term of this patent is extended or adjusted under 35 U.S.C. 154(b) by 150 days.

(21) Appl. No.: 12/068,359

(22) Filed: Feb. 5, 2008

(65) Prior Publication Data

US 2009/0194549 A1    Aug. 6, 2009

(51) Int. Cl.
*B65D 51/16*    (2006.01)
*B65D 1/44*    (2006.01)

(52) U.S. Cl. .................. 220/369; 220/731; 219/733; 219/735

(58) Field of Classification Search .......... 220/731, 220/369, 367.1, 669, 671, 676, 370; 219/734, 219/735, 725, 729, 733
See application file for complete search history.

(56) References Cited

U.S. PATENT DOCUMENTS

| | | | | |
|---|---|---|---|---|
| 612,513 | A * | 10/1898 | Bowers | 220/369 |
| 2,002,237 | A * | 5/1935 | Roland | 220/369 |
| 2,814,381 | A * | 11/1957 | Stevick | 426/129 |
| 2,999,559 | A | 9/1961 | Boyer | |
| 4,422,441 | A | 12/1983 | Schoepe | |
| 4,563,561 | A * | 1/1986 | Vaeth et al. | 219/735 |
| D297,298 | S * | 8/1988 | Sarnoff et al. | D7/391 |
| 4,801,773 | A | 1/1989 | Hanlon | |
| 4,989,748 | A * | 2/1991 | Parr et al. | 220/368 |
| D409,736 | S | 5/1999 | Koehn | |
| D441,290 | S * | 5/2001 | West | D9/443 |
| 6,325,234 | B1 * | 12/2001 | Legaspi | 220/367.1 |
| 6,803,552 | B1 | 10/2004 | Irizarry et al. | |
| 7,244,915 | B2 * | 7/2007 | Wright | 219/734 |
| 7,414,229 | B2 * | 8/2008 | Hellmann et al. | 219/729 |
| D588,866 | S * | 3/2009 | Ho | D7/391 |
| 2003/0205575 | A1 * | 11/2003 | DeWinter | 219/725 |
| 2004/0164074 | A1 | 8/2004 | Newton | |
| 2006/0027575 | A1 | 2/2006 | Lombardo et al. | |
| 2006/0151489 | A1 | 7/2006 | Hellmann et al. | |
| 2006/0213905 | A1 | 9/2006 | Shaw et al. | |

* cited by examiner

*Primary Examiner*—Anthony Stashick
*Assistant Examiner*—Niki M Eloshway
(74) *Attorney, Agent, or Firm*—Richard C. Litman

(57) ABSTRACT

The disposable splatter guard is a cover for food being heated in a microwave oven. The splatter guard has a fluted wall member and a semi-rigid, pyramidal top made from a fluted material. The flutes of the wall member and the pyramidal top maintain rigidity and prevent the splatter guard from collapsing into the food product. The top has a plurality of vents to allow steam to escape. The pyramidal configuration prevents condensation from dripping back onto the cooked food and permits easy stacking and dispensing. The disposable splatter guard is made from a microwave transparent material, such as paper.

5 Claims, 4 Drawing Sheets

DISPOSABLE SPLATTER GUARD

BACKGROUND OF THE INVENTION

1. Field of the Invention

The present invention relates generally to appliances for microwave ovens, and more particularly to a disposable splatter guard to prevent food splattering on the interior walls of a microwave oven.

2. Description of the Related Art

Microwave ovens have revolutionized food preparation since their use became widespread in the 1970's. Formerly found only in large industrial applications, microwaves are now a standard feature of most kitchens. Current estimates hold that 95% of American homes have a microwave oven.

Microwave ovens cook by passing non-ionizing microwave radiation, usually at a frequency of 2.45 GHz, through the food. The microwaves are absorbed in the outer layers of food similar to other heating methods. Depending on water content, food composition and the frequency of the radiation, microwaves deposit initial heat more deeply than other cooking methods. Microwave ovens are generally used for time efficiency rather than for cooking quality, both in commercial applications, such as restaurants and offices, and at home.

Cooking in a microwave poses some unique problems that commonly do not occur with conventional cooking methods. Chief among these problems is splattering, which occurs when uncovered food splatters on the interior of the microwave oven because of the pressure build-up of steam.

Splattering occurs because liquids, when heated in a microwave oven, can superheat and reach temperatures above their normal boiling point. The boiling process can start explosively when the liquid is disturbed, such as when the container is moved or when other liquids are added or drip into the food product. Because many frozen and prepared food products contain water, they can boil explosively because of the build-up of steam.

Food splattering can cause unsightly stains on the inside of a microwave oven that can be difficult to remove and can cause damage to the oven. This can be a problem in places where microwave ovens are used by many individuals, such as convenience stores or employee lunchrooms. Additionally, because of the lower temperatures inside a microwave oven, food buildup on the walls of the oven can foster the growth of molds and bacteria and create an unsanitary and unhealthy cooking environment.

Traditionally, people have covered items being heated or re-heated in a microwave oven with paper towels or another plate to prevent food splatter. This may not always be a convenient solution to the problem, as additional plates may not be available in a commercial setting, and using a paper towel or napkin as a covering can be unsatisfactory as well.

Paper towels and napkins often become saturated by the steam given off from the cooking food and tear or drip down into the food item. A sopping wet paper towel or napkin adhering to a person's microwave lunch is not only messy and unappealing; it can be unsanitary as well.

Thus, a disposable splatter guard solving the aforementioned problems is desired.

SUMMARY OF THE INVENTION

The disposable splatter guard is a semi-rigid, porous cover made of material transparent to microwave energy, used for covering a dish being heated in a microwave oven. The splatter guard has a wall member defining an enclosure open at the top and bottom. The wall member has a fluted outer surface that defines generally polygonal top and bottom peripheries. The wall member provides self-supporting rigidity and completely prevents food cooking in a microwave from splattering the inside of the oven.

The disposable splatter guard has a fluted, pyramidal top member. The flutes maintain the rigidity of the pyramidal top and prevent the splatter guard from collapsing into the cooking food. The pyramidal configuration also allows condensation from the cooking process to run down the sides instead of dripping back onto the food. The top member has a plurality of vents to permit steam to escape during the cooking process.

The pyramidal configuration of the top member of the disposable splatter guard provides secure stacking for easy and sanitary dispensing, and also makes the disposable splatter guard easy to fold if flat storage is desired. These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates to a disposable splatter guard used for covering a dish being heated or reheated in a microwave oven to prevent the heating food from splattering the interior of the microwave.

Figure 1:
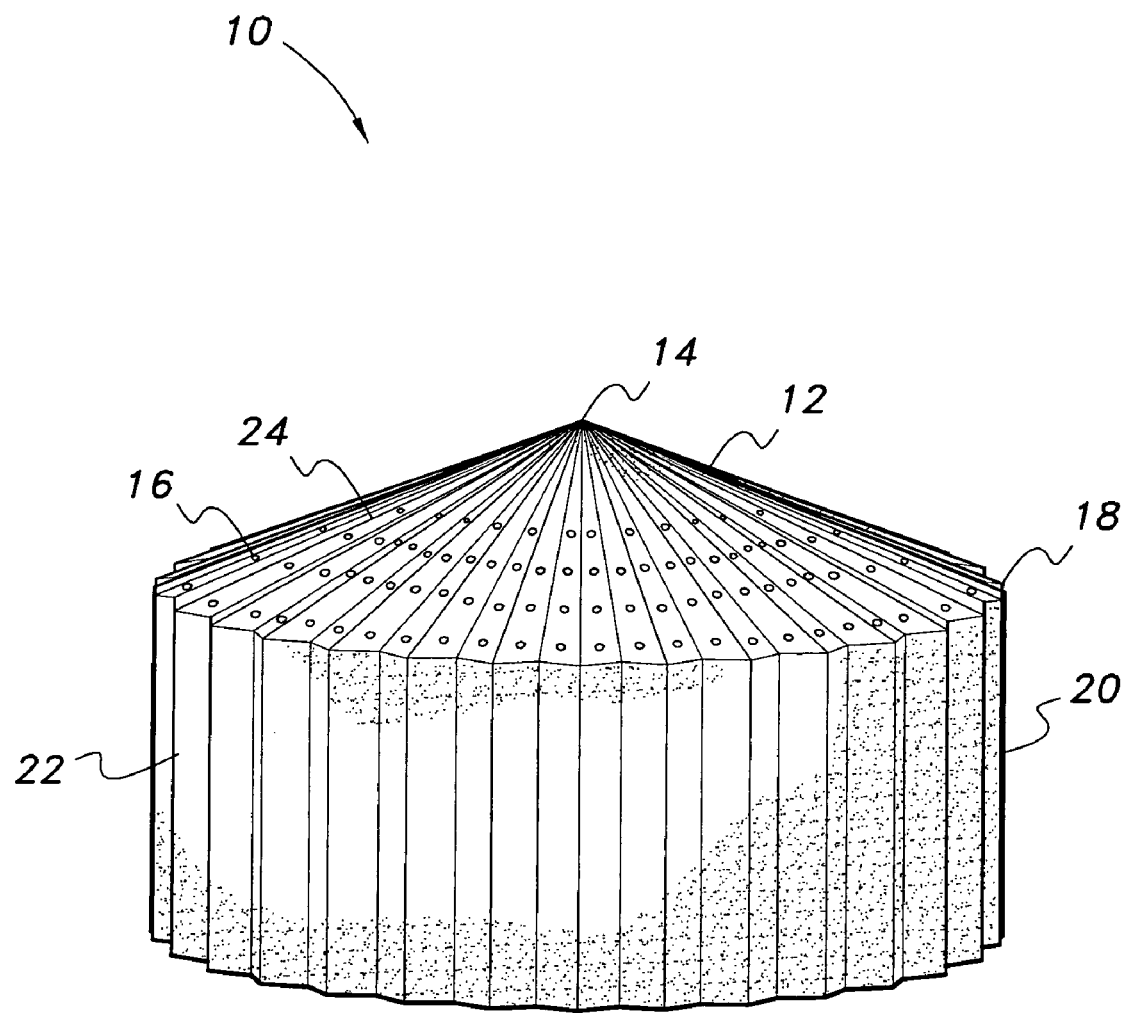
FIG. 1 is a perspective view of a disposable splatter guard according to the present invention.

FIG. 1 is a perspective view of a disposable splatter guard, hereinafter designated as 10, showing a wall member 20 defining an enclosure open at the top and bottom, the wall member 20 being formed from disposable, absorbent material, such as filter paper, having a plurality of flutes 22 to maintain rigidity. The enclosure formed by the fluted wall member defines polygonal top and bottom peripheries. An upper pyramidal surface 12 extends from the upper peripheral edge 18 of the fluted wall member 20. The upper pyramidal surface 12 has a plurality of flutes 24 radially disposed that extend from the peripheral edge 18 of the wall member 20 to an apex 14. The flutes 24 on the upper pyramidal surface 12 maintain rigidity of the upper pyramidal surface 12 and prevent the splatter guard 10 from collapsing into the food item. A plurality of steam vents 16 are defined in the upper pyramidal surface 12 to allow the escape of steam generated during the microwave cooking process.

Figure 2:
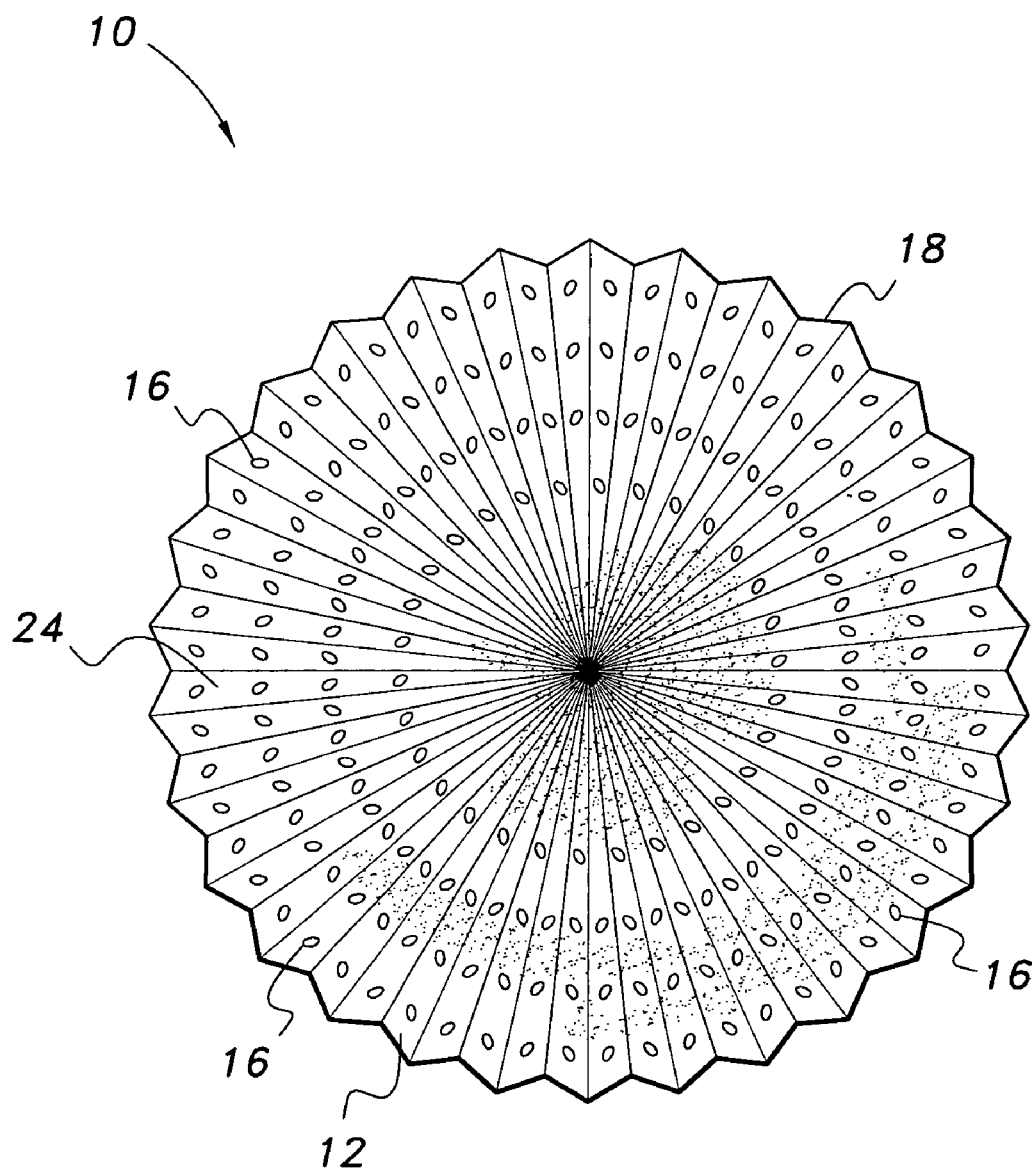
FIG. 2 is a top view of a disposable splatter guard according to the present invention.

FIG. 2 is a top view of the splatter guard 10 showing the flutes 24 extending from the apex 14 to the upper peripheral edge 18 of wall member 20 and the arrangement of the steam vents 16 in rows having the same altitude.

Figure 3:
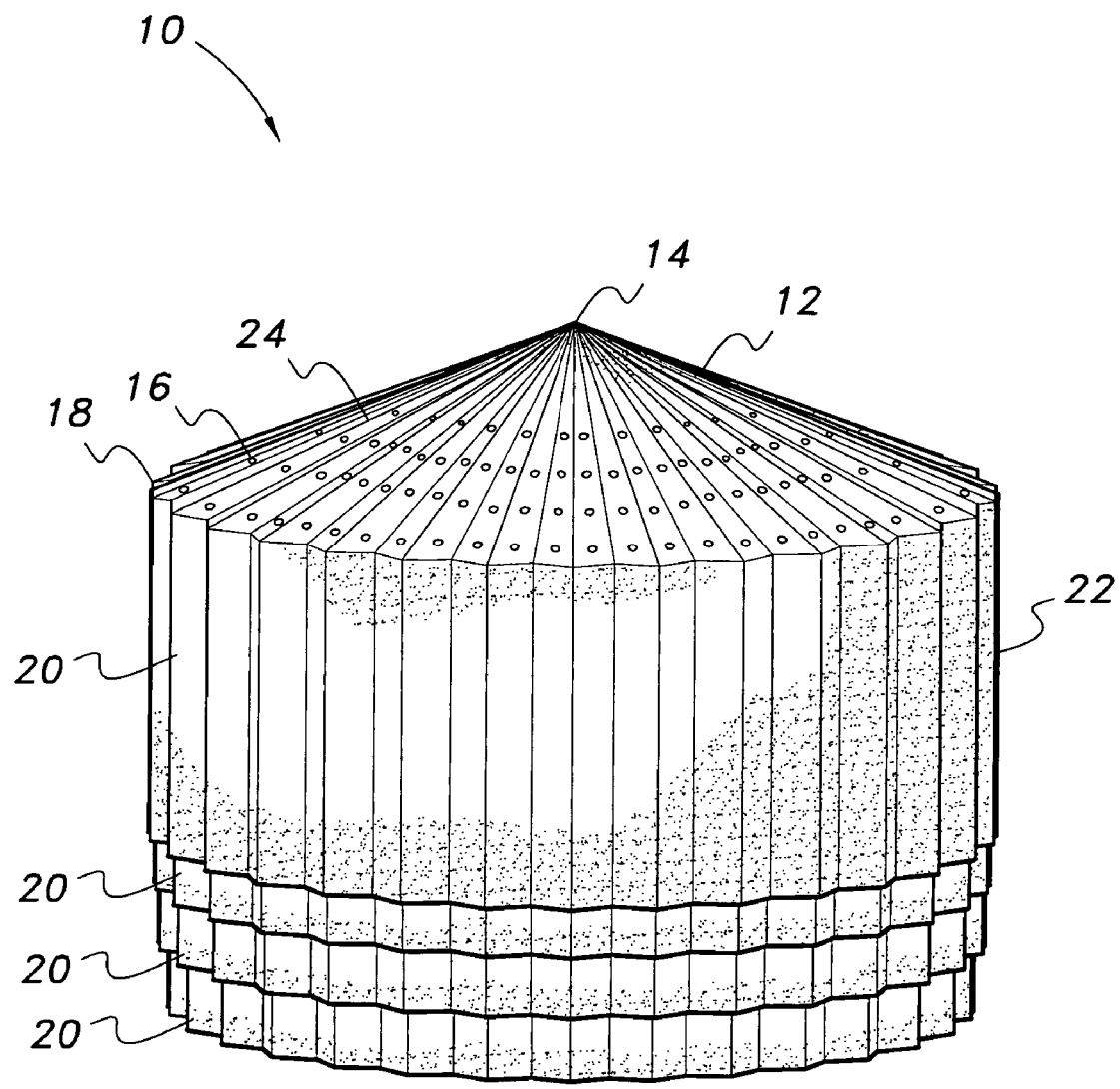
FIG. 3 is a side view of a stack of disposable splatter guards according to the present invention.

FIG. 3 illustrates the splatter guard 10 in a stacked configuration for easy dispensing. The splatter guard 10 can be securely stacked because of the configuration of the upper pyramidal surface 12. The apex 14 provides a convenient and sanitary way to pull a splatter guard 10 off of the stack. The pyramidal configuration also makes the splatter guard 10 easy to fold if flat storage is desired.

Figure 4:
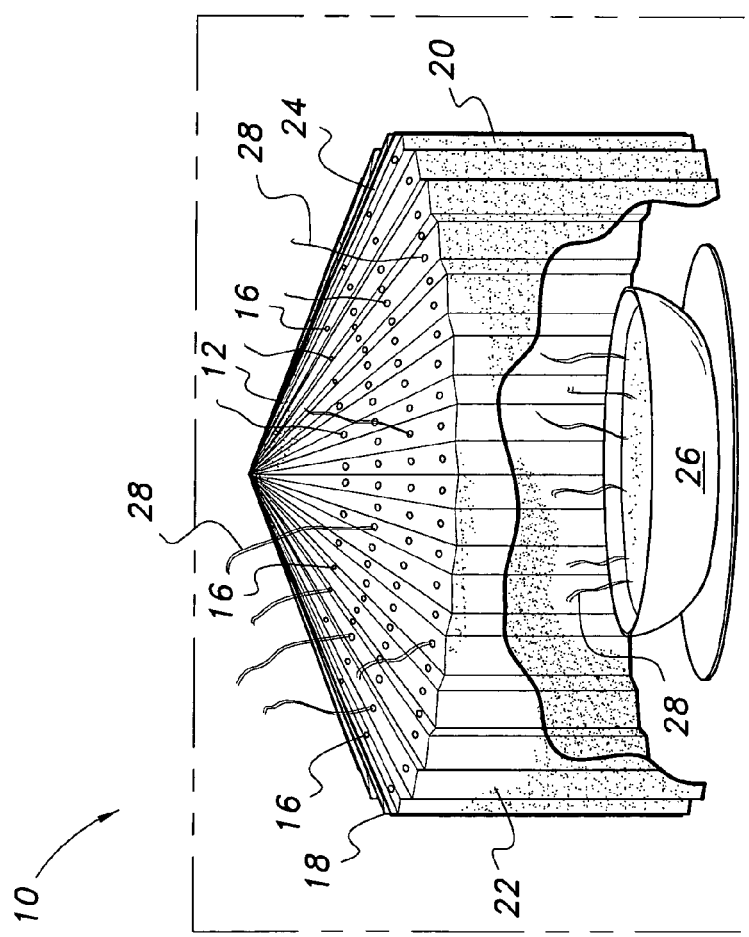
FIG. 4 is an environmental, perspective view of a disposable splatter guard according to the present invention, shown with the enclosure broken away.

FIG. 4 is a view of the splatter guard 10 covering a food item 26. The steam vents 16 on the upper pyramidal surface 12 allow the steam 28 to escape. Any additional liquid or vapor will condense on the interior of the upper pyramidal surface 12, run down to the peripheral edge 18 and down the interior of the wall member 20 instead of dripping back into the food item 26.

It is to be understood that the present invention is not limited to the embodiments described above, but encompasses any and all embodiments within the scope of the following claims.

I claim:

1. A disposable splatter guard for a dish in a microwave, comprising:
   a semi-rigid, fluted wall member defining an enclosure having a polygonal upper peripheral edge, a polygonal bottom edge, and an outer surface, the enclosure being adapted for laterally enclosing an article of food placed in a microwave oven; and
   a semi-rigid, pyramidal top member extending from the upper peripheral edge of the enclosure, the pyramidal top member defining an upper surface and an apex, the top member being made from a fluted material substantially corresponding to the fluted wall member, the toy member flutes being radially disposed and extending from the peripheral edge of the wall member to the apex, thereby defining the lateral faces of the pyramidal top member, wherein each of the flutes of the pyramidal top member has a plurality of vent holes defined therein to permit steam to escape when heating the article of food in the microwave oven, the top member enclosing the article of food above the wall member, the wall member and the top member preventing the article of food from splattering top and sidewalls of the microwave oven when the food is cooked.

2. The disposable splatter guard according to claim 1, wherein the wall member and the top member are made from a material transparent to microwave energy.

3. The disposable splatter guard according to claim 1, wherein the wall member and the top member are made from a disposable, absorbent material.

4. The disposable splatter guard according to claim 1, wherein the wall member and the top member are made from filter paper.

5. A disposable splatter guard for a dish in a microwave, comprising:
   a semi-rigid, fluted wall member defining an enclosure having a polygonal upper peripheral edge, a polygonal bottom edge, and an outer surface, the enclosure being adapted for laterally enclosing an article of food placed in a microwave oven; and
   a semi-rigid, pyramidal top member extending from the upper peripheral edge of the enclosure, the pyramidal top member defining an upper surface and an apex, the top member being made from a fluted material substantially corresponding to the fluted wall member, the top member flutes being radially disposed and extending from the peripheral edge of the wall member to the apex, thereby defining the lateral faces of the pyramidal top member, wherein substantially all of the flutes of the pyramidal top member have at least one vent hole defined therein to permit steam to escape when heating the article of food in the microwave oven, the top member enclosing the article of food above the wall member, the wall member and the top member preventing the article of food from splattering top and sidewalls of the microwave oven when the food is cooked.

* * * * *